Figure 1:
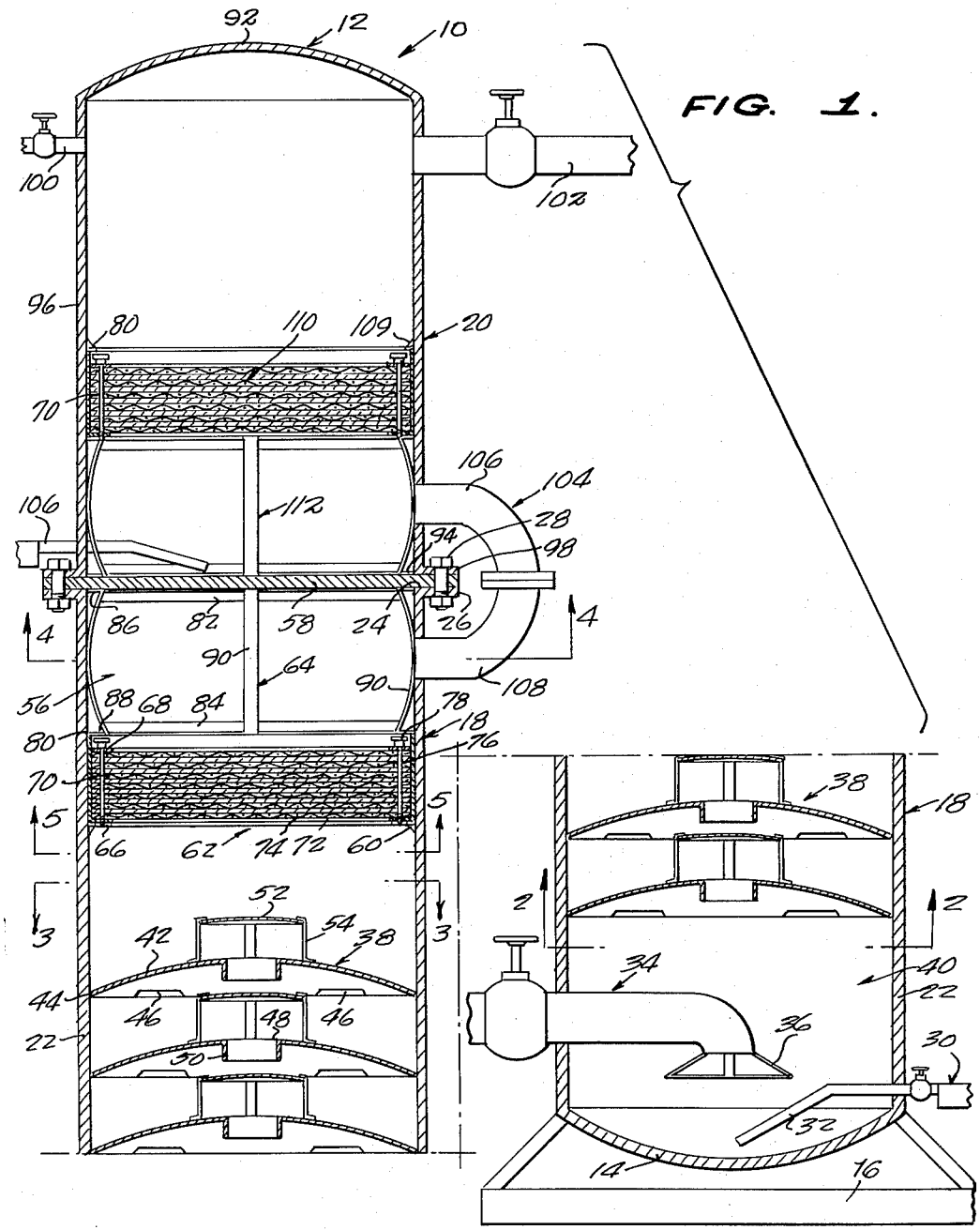
Figure 2:
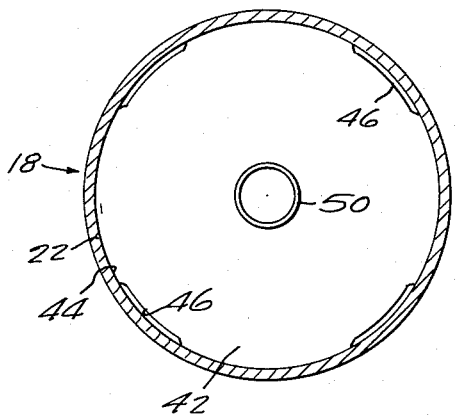
Figure 3:
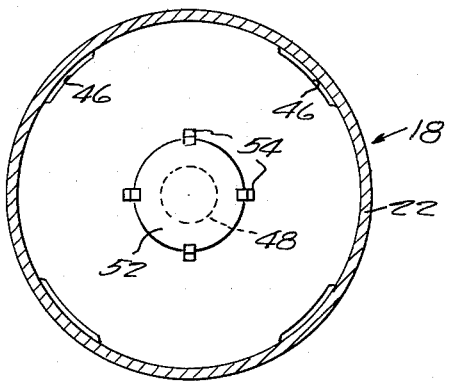
Figure 4:
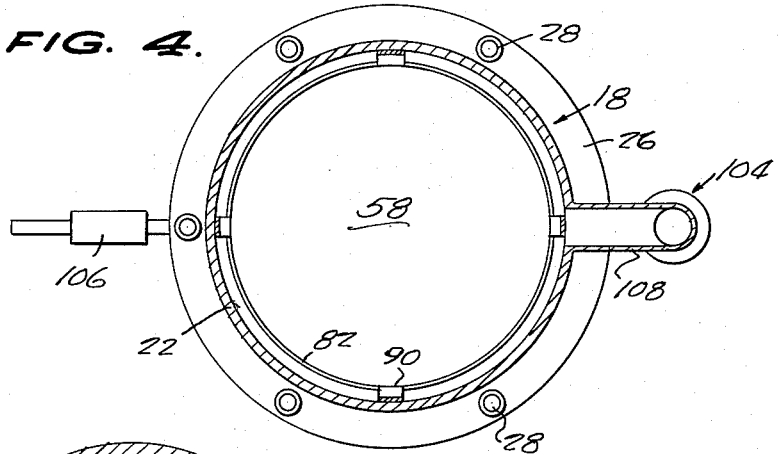
Figure 5:
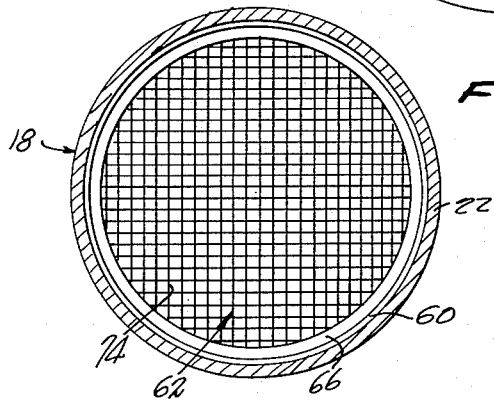

July 18, 1961  J. L. PEARSON ET AL  2,992,698
COMBINATION SEPARATOR AND DEHYDRATOR
Filed March 7, 1958  2 Sheets-Sheet 1

INVENTORS
JOHN L. PEARSON,
JOHN E. BALL,
BY
McMorrow, Berman & Davidson
ATTORNEYS.

July 18, 1961 J. L. PEARSON ET AL 2,992,698
COMBINATION SEPARATOR AND DEHYDRATOR
Filed March 7, 1958 2 Sheets-Sheet 2

INVENTORS
JOHN L. PEARSON,
JOHN E. BALL,
BY
McMorrow, Berman & Davidson
ATTORNEYS.

2,992,698
COMBINATION SEPARATOR AND DEHYDRATOR
John L. Pearson, Rte. 1, Ignacio, Colo., and John E. Rall, Towaoc, Colo. (506 N. Orchard Ave., Farmington, N. Mex.)
Filed Mar. 7, 1958, Ser. No. 719,798
1 Claim. (Cl. 183—2.7)

This invention relates to a combination separator and dehydrator for treating gas issuing from gas wells.

The primary object of the invention is to provide more efficient and economical apparatus of this kind which substantially reduces the expenditures of time, labor, and expense heretofore involved in separating out hydrocarbon liquids, moisture, and particles, such as sand and rust scale, from gas issuing from gas wells.

Another object of the invention is to provide apparatus of the character indicated which separate and dehydrate in a single pass, without the intervention of other steps and apparatus, and without the use of chemical substances, such as glycol or calcium chloride, and wherein the pass of the gas is uninterrupted and continuous, and is accomplished by the pressure of the gas as it issues from a well.

A further object of the invention is to provide apparatus of the character indicated above which comprises a single casing involving a relatively stationary lower baffle separator section, and a removable upper dehydrator filter section, containing readily removable and replaceable filter elements, the upper section being easily and quickly removable from and replaceable on the lower section for inspecting, removing, and replacing filter elements.

A still further object of the invention is to provide, in apparatus of the character indicated above, gas dehydrating filter elements which are units composed of layers of non-chemical hygroscopic material, preferably chamois, held in contact with each other under pressure between perforated plates or discs, through which gas rises after passage through the separator section, so that moisture remaining in such gas is taken out and caught and the dehydrated gas freed to pass out of the apparatus.

A yet further object of the invention is to provide apparatus of the character indicated above wherein the upper and lower sections are isolated from each other and gas communication between the sections is confined to a separable pipe union, and wherein separate automatic dumps lead from the lower ends of the sections for automatically discharging accumulation of liquid produced therein as an incident to operation of the apparatus, as liquid hydrocarbons and water are stripped from gas passing through the apparatus.

Other important objects and advantageous features of the invention will be apparent from the following description in the accompanying drawings, wherein, for purposes of illustration only, a specific form of the invention is set forth in detail.

In the drawings:

FIGURE 1 is a vertical transverse section taken through apparatus of the invention; and FIGURES 2, 3, 4 and 5 are horizontal sections taken on the lines 2—2, 3—3, 4—4 and 5—5 of FIGURE 1.

Referring in detail to the drawings, wherein like numerals designate like parts throughout the several views, the illustrated apparatus, generally designated 10, comprises a vertically elongated, cylindrical casing 12 having a concave bottom wall 14 resting upon a suitable base 16. The casing 12 is composed of a lower separator section 18, and an upper dehydrator section 20, the upper section 20 being in this instance, shorter than the lower section 18.

The lower section 18 has a side wall 22 and an open upper end 24 having therearound an external lateral flange 26, through which fastening bolts 28 extend. A lower automatically operated dump 30 has a pipe 32 leading through the side wall 22 into the lower part of the section 18 near its bottom wall 14. A horizontal well gas input pipe 34 traverses the side wall 22 on a level above the bottom wall 14 and has a downwardly flaring centralized head 36 which acts to spread the surge of gas entering the section 18 and to free liquids in the gas and direct the gas and such liquid downwardly into the liquid collection basin defined by the concave bottom wall 14.

Spaced near to and above the spreader head 36 is a tier of baffles 38 which, with the lower part of the section 18 defines a turbulence chamber 40. The baffles 38 comprise lower convex-concave metal discs 42 having peripheral edges 44 fixed to the side wall 22 and provided with circumferentially spaced notches or scallops 46 forming liquid drain passages. The discs 42 have central openings 48 in which are secured short, open-ended depending vertical tubes 50. Mounted on the upper sides of the discs 42 concentrically above the tubes 50 are upper convex-concave discs 52, substantially smaller in diameter than the discs 42, and supported by circumferentially spaced vertical strap legs 54. As shown in FIGURE 1, the smaller upper discs 52 are located on a level with the lower edges of the discs 42 of baffles 38 thereabove.

The tier of baffles 38 is spaced at its upper end below the upper end 24 of the lower casing section 18, so as to define a filter chamber 56 in the upper end of the lower section, and an imperforate divider plate 58, larger in diameter than the section 18 is removably engaged on and registered with the upper end 24 of the section 18 and overlies the flange 26 and is traversed by the bolts 28.

At a point spaced above the baffle tier 38 is such as an annular rib 60 upon which rests a removable and replaceable lower dehydrating filter unit 62, which is spaced from the upper end of the section 18 by a compressible spring spacer 64, which serves to hold the filter unit 62 down in place and in gas and liquid-tight relation to the side wall 22, the spacer 64 being compressed between the divider plate 58 and the filter unit 62.

The filter unit 62 comprises a bottom annular flange or ring 66, which rests upon the rib 60 and may have a groove at its outer edge to accommodate an O ring for sealing engagement with the casing side wall 22, a top annular flange or ring 68, and a side wall 70 on which the bottom ring 66 is fixed, and in which the top ring 68 is vertically movable and removable. Seated within the side wall 70 and resting upon the bottom ring 66 is a tier composed of alternating sheets 72 of chamois and screens 74, preferably of fine mesh stainless steel. The lowermost screen 74 rests upon the bottom ring 66, while the top ring 68 rests upon the uppermost screen 74. Traversing the top ring 68 and threaded into the bottom ring 66 are circumferentially spaced screws 76, having heads 78 on their upper ends, which are arranged to be turned to tighten down and compress together the screen and chamois layers of the filter unit 62 and to spread the felt layers into sealing engagement with the side wall 70. The upper edge 80 of the filter unit side wall 70 projects above the screws 76.

The spacer 64 comprises spaced upper and lower annular collars 82 and 84, respectively, having lateral flanges 86 and 88 thereon to bear against the lower section side wall 22, and spaced and connected by resilient spring steel strips 90 secured thereto at circumferentially spaced points therearound. The collars 82 and 84 are smaller in diameter than the casing side wall 22 and the spring strips 90 are conditioned to bow outwardly, as shown in FIGURE 1, when the spacer 64 is under compression, and engage the casing side wall 22. The spacer 64 is initially taller than the space between the filter unit 62 and the divider plate 58, and is compressed by securement of the divider plate 58 on the flange 26 on the upper end 24 of the lower casing section 18. The lower flange 88 bears upon the upper edge 80 of the filter unit side wall 70.

The upper casing section 20 has a convex-concave top wall 92, an open lower end 94, and a side wall 96, and an external annular flange 98 around its lower end, which registers with the flange 26 on the upper end of the lower section 18, atop the divider plate 58, when the sections are registered. A sampling valve 100 traverses the side wall 96 near the top wall 92, and a valved outlet pipe 102, for the separated and dehydrated gas product of the apparatus, traverses the side wall 96 near the top wall 92.

Providing sole communication between the upper and lower casing sections 20 and 18 is a separable pipe union 104, consisting of an upper flanged section 106 traversing the lower part of the side wall 96 of the upper section 20, and a lower flanged section 108 traversing the side wall 22 of the lower section 18 at a point above the filter unit 62, respectively. The flanged ends of the pipe union sections are registered and in communication with each other when the casing sections are registered with each other, and the bolts 28 are tightened. Suitable sealing gaskets (not shown) are adapted to be interposed between the divider plate 58 and the casing section flanges 26 and 98.

An upper automatic dump pipe 106 traverses the side wall 96 of the upper casing section 20 near its lower end 94 for automatically drawing of accumulations of moisture in the lower part of the upper section 20.

At a point about midway between the ends of the upper casing section 20 is an internal annular rib 109, similar to the rib 60 in the lower section 18, and an upper filter unit 110, similar to the lower filter unit 62, has the upper edge 80 of its side wall 70 against the underside of the rib 109, where it is held by a spacer 112, similar to the spacer 64, and resting upon the divider plate 58. Like the filter unit 62 and the spacer 64, the filter unit 110 and the spacer 112 are readily removable and replaceable in the upper casing section 20.

Whenever it is desired to inspect, or replace filter units in the apparatus for rejuvenating the apparatus, all but one of the bolts 28 are loosened and removed from the flanges 26 and 98 and the divider plate 58, and the upper section 20 and the divider plate 58 swung to one side on the axis of the one remaining bolt 28, whereupon the sections 18 and 20 are accessible for removal and replacement of filter units. The sections 18 and 20 are reassembled by reversing these operations.

It is to be observed that the gas input pipe 34 is to be connected directly to a gas well pipe (not shown) whereby gas issuing from the well is forced by its own pressure alone, to enter the lower casing section 18 and move upwardly therein through the baffle tier 38, so that the gas is stripped of liquid hydrocarbons and such as scale particles; and through the lower filter unit 62, so that the stripped gas has water and other moisture stripped therefrom; and through the pipe union into the upper casing section 20 and upwardly through the upper filter unit 110 where the partially dehydrated gas is further stripped of moisture and passes out of the outlet pipe.

Moisture and liquid, such as hydrocarbons, stripped from the gas in its pass through the apparatus, falls through the notches or scallops 46 of the baffles 38 into the basin in the lower end of the lower section and is subject to be drawn off by the lower automatic dump; and falls from the upper filter unit 110 onto the upper section bottom constituted by the divider plate 58, where it is subject to being drawn off by the upper automatic dump.

The above described apparatus is suitable for projecting well gas at well pressure into a confined space and causing the confined gas to move upwardly therein and mechanically stripping the same of hydrocarbon and heavy liquids, such as water, then removing entrained moisture by subjecting the gas, after the stripping, to straining out of and absorption of moisture therefrom by hydroscopic filter means, and immediately discharging the gas from confinement, these operations being performed in a single pass and continuously, and periodically drawing off accumulations in said space of stripped out liquid hydrocarbons and water and absorbed and strained out moisture.

Although we have shown and described herein a specific form of our invention, it is to be understood that any change or changes in the structure and in the relative arrangements of the components are contemplated as being within the spirit and scope of the invention as defined by the claim appended hereto.

What is claimed is:

A combined separator and dehydrator for well gas, comprising a vertically elongated closed casing composed of separable upper and lower sections, having open lower and upper ends, respectively, an imperforate divider plate positioned between the sections and closing said open ends, an external transfer pipe bridging said divider plate and secured at related ends to and opening through the side walls of the upper and lower sections, the casing sections being not otherwise in communication with each other, means separably securing the casing sections and the divider plate together, an upper filter unit mounted within the upper section, said upper filter unit being spaced below the upper end of the upper section and spaced above the divider plate and the point of entrance of the transfer pipe into the upper casing section, a lower filter unit mounted within the lower casing section, said lower filter unit being spaced above the lower end of the lower section and spaced below the divider plate and below the point of entrance of the filter pipe into the lower casing section, a well gas input pipe entering said lower casing section, at a point spaced below said lower filter unit, and a gas outlet on the upper casing section above the upper filter unit near the upper end of the upper casing section, said filter units being removable through the open end of related casing sections, upon separation of the casing sections, said sections having side walls having internal annular ribs thereon spaced from the open ends of the sections and against which one end of the filter units bear, and resilient removable spacers located in the casing sections at the open ends thereof and compressed between the divider plate and the other ends of the filter units for holding the filter units removably in place.

References Cited in the file of this patent

UNITED STATES PATENTS

| | | |
|---|---|---|
| 243,285 | McDaniel | June 21, 1881 |
| 1,235,998 | Neeley | Aug. 7, 1917 |
| 1,319,574 | DiSante | Oct. 21, 1919 |
| 1,443,435 | Rohrer | Jan. 30, 1923 |
| 1,871,546 | McClafferty | Aug. 16, 1932 |
| 2,026,935 | Downs | Jan. 7, 1936 |
| 2,116,537 | Miller | May 10, 1938 |
| 2,701,624 | Krieble | Feb. 8, 1955 |
| 2,765,868 | Parks | Oct. 9, 1956 |